UNITED STATES PATENT OFFICE.

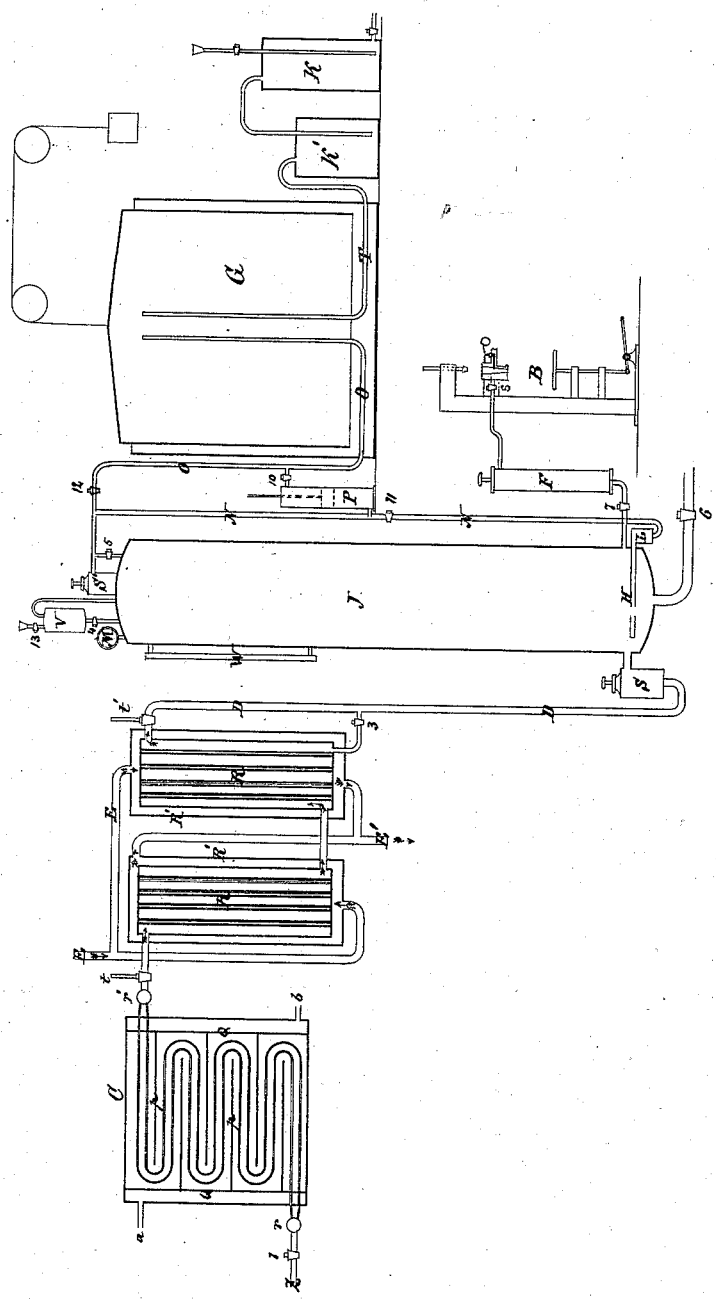

JOSEF BERSCH, OF BADEN, AUSTRIA, ASSIGNOR OF ONE-HALF HIS RIGHT TO HENRY GUTH, OF NEW YORK, N. Y.

IMPROVEMENT IN PRESERVING BEER.

Specification forming part of Letters Patent No. 194,324, dated August 21, 1877; application filed May 22, 1877.

*To all whom it may concern:*

Be it known that I, JOSEF BERSCH, of Baden, in the Empire of Austria, have invented a new and useful Improvement in Preserving Beer, which improvement is fully set forth in the following specification, reference being had to the accompanying drawing.

The difficulty in keeping beer for any length of time, the losses caused by deterioration, and the resulting high prices, prevent the consumption of large quantities of beer in tropical countries. The various trials to prevent deterioration, by adding certain preservative substances, have partly given very uncertain results, and partly are those substances, although used in very small quantities, discovered by a peculiar flavor of the beer, and exercise an unhealthy influence.

By my improvement beer can be kept for any length of time without being liable to deterioration, or to form any deposit in the bottle or cask, but remains unchanged in every respect.

My improvement allows the beer to be given any quantity of froth, and is applicable to all qualities of malt liquors, and the thus treated liquid can be shipped either bottled or in bulk.

The nature of my invention consists in heating the beer up to 234° Fahrenheit, (112° Celsius,) and, without allowing the same to come in contact with the atmospheric air, to pass the same into a suitable vessel, in which it is freed from the compact impure substances, which, owing to the heat, separate and settle in the bottom, when it can be either bottled or filled in casks. This system allows, likewise, an impregnation of a more or less larger quantity of alcohol, and the result of the entire treatment is a more delicate and pure flavor. By heating the beer to this degree all the organisms the beer may contain are killed, and thus the causes for any changes in the nature of the fluid are removed.

By heating the beer to from 160° to 212° Fahrenheit the organism of the yeast-cells are killed, while other ferments continue their vital power up to near 234° Fahrenheit, and beer heated below this degree, even if not brought in contact with air, is still liable to deterioration after some time, while heating to 234° Fahrenheit, even for a single moment, is sufficient to kill the organism which the beer may contain.

The heating of the beer must be done before bottling, and in a special apparatus, so constructed that the carbonic acid cannot escape, and will attain this temperature of 234° very quickly.

After the beer has been heated it will appear brilliant, but soon becomes dim, which is the result of the separation of albuminate, being dissolved in the beer, but made insoluble by the heating.

The apparatus for the preservation of beer is so constructed that the compact separating substances can be entirely removed. If more froth is wanted in a beer which has not been kept some time in cool cellars, it is impregnated with carbonic acid. The apparatus for the formation of carbonic acid—a constituent part of the preservation apparatus—not only answers the purpose of saturating the liquid with carbonic acid, but has still other functions, which will be detailed hereinafter.

By means of a suitable pump the beer is brought from the reservoir into the pipe Z and forced through the apparatus. This pipe is provided with a cock, 1, to shut the beer off. C is the heating apparatus, which should be covered with wood, so as to lose as little heat as possible. This chamber is provided with two vertical cross-walls, Q, in the interior, between which horizontal plates $p$, extending the entire breadth of the chamber, are arranged and fastened alternately to the one or the other wall Q.

The pipe Z terminates in a cross-pipe, $r$, from which a number of smaller pipes branch off, entering the chamber C, and pass backward and forward through the same between the plates $p$, terminating in the cross-pipe $r'$, from which it passes into the coolers.

The beer forced or passing through these pipes is heated by steam or air of high temperature, which enters the chamber C at $a$ and leaves it at $b$. The cross-walls Q are perforated opposite the bent of the pipes, so that the same come in direct contact with the heated steam or air. Into the outflow-pipe a thermometer, t, is placed, to indicate the temperature and indicate that the beer has been heated to at least 234°.

R R are the cooling-chambers. The same are provided with a series of tubes similar to a steam-boiler, to obtain a large cooling-surface. These chambers are surrounded by external cylinders R' R'.

Cold water is introduced into the space between the inner and outer cylinders through the pipe E, while the heated water, after passing around and through the coolers, runs off at E', circulating as indicated by the arrows.

The previously-heated beer passes from the heating-chamber C into the top of the first cooler R, and then into the bottom of the second cooler, and escapes at the upper end of this second cooler through the pipe D, into which a thermometer, t', is placed to indicate the temperature of the beer in running off.

At the bottom of the second cooler a pipe is attached passing into the pipe D, and provided with a cock, 3, to empty the vessel entirely at the end of the operation.

From the coolers the beer passes through the pipe D into the bottom of the impregnating-vessel J. Near the entrance of the pipe into this vessel J a weighted valve, S, is placed, through which the beer must pass to allow the use of various pressures. This impregnating-vessel J consists of a vertical vessel provided with a number of height-indicators, W, on the outside, a manometer, M, on the top, as well as a vessel, V, and a pressure-valve, S', similar to the valve S, at the bottom. In the bottom of this vessel J a spirally-wound tube, H, perforated at the under side, is arranged, connected through the pipe N (provided with a check-valve, L,) with the force-pump P. At the lower end of the vessel J a pipe is arranged closed by a cock, 6.

It is of importance that all parts of the apparatus which come in contact with the beer are made of such metal as will not be attacked by the fluid.

F is a filter, consisting of a cylinder, into which several sieve-formed cross-plates can be placed. From its upper part a tube, to be closed by a cock, s, leads to the bottling apparatus B. Into this cylinder a linen bag filled with sand is placed, with a sieve-plate on top; then a second similar bag put on top, followed by another sieve-plate, and then a number of sheets of very spongy felt, and the whole pressed down with a screw passing through the top of the cover.

The apparatus for the formation of carbonic acid consists of two vessels, K, in which carbonic acid is formed, and K' a wash-basin for purifying the acid. From the latter runs a tube, T, to the gas-meter G.

The pipe O leading from the gas-meter is connected with the force-pump P and with the top of the vessel J. The cock 10 closes the eduction-pipe O from the pump, and the cocks 11 and 12 close this tube O at the upper and lower ends. The force-pump P is likewise connected by a suitable pipe (not shown in the drawing) with the pipe Z between the cock 1 and the pipe r.

In using the apparatus the first time all cocks, except 4 and 13, belonging to the vessel V on top of chamber J must be closed. Beer is then pumped into the pipe Z and steam allowed to enter the heating-chamber C at a until the pipes are warmed, when cock 1 is opened, and at the same time cold water run into the cylinders R'. The thermometer t must be constantly examined to make sure that the beer leaves the tubes at r' at 234°. A temperature of 245° does no injury. The beer must be cooled down to at least 50° Fahrenheit. The thus-cooled beer enters then the cylinder J through tube D and valve S. The valve S should be loaded to at least two to three atmospheres. This pressure is necessary for the remixing of the carbonic acid which was freed during the heating. As soon as the cylinder J is filled the beer is conducted into a second or third similar cylinder, and the cocks 4 and 13 in the filled cylinder are closed. When the cask from which the beer was drawn is empty, cock 1 is closed, and by opening a cock in the pipe connecting pump P with the pipe Z, carbonic acid is forced into the apparatus until the tubes in the heater C and the first cooler R do not hold anything else but carbonic acid. At the same time cock 3 is opened to allow the beer in the second cooler R to flow off into the pipe D. If a more fiery froth is wanted, carbonic acid is forced direct into the cylinder J through the pump P and continued for some minutes after the manometer M shows the desired pressure. That part not absorbed by the beer opens valve S' and enters the pump again.

The beer in the cylinder J, whether impregnated with acid or not, must remain in the same until the compact substances which have separated from it are deposited, which, by virtue of the use of the below-mentioned finings, will be reached in about one week, after which the beer can be filled in bottles or casks.

During the heating and cooling of the beer, a large quantity of compact substances separate, the density of which is only a trifle less than that of beer, and would require a very long time to deposit completely.

To obtain a brilliant clear fluid as soon as possible, finings are put into the beer while in the cylinder J, which cause the deposit of the aforesaid substances, and fully unite with the same.

This solution consists of glue and tannin, which I prepare as follows: Thin sheets of gelatine are put side by side, but without touching, in water, which is mixed with one per cent. of acetic acid. After an hour the water is changed, and this operation repeated six times. This washing is absolutely necessary to make the glue perfectly pure. These washed sheets of gelatine are put in an enameled pot, melted at the least possible heat, poured in sheet pans, and allowed to coagulate. These pure sheets must be very carefully dried in a heated room. The respective quantity is put in an enameled pot, and a little beer is poured over, warmed to about 122° Fahrenheit, until fully dissolved. The remainder of the beer intended for the dissolution is added, and the whole thoroughly mixed and boiled as quick as possible. As soon as the boiling-point is reached, the vessel is immediately put in cold water for cooling. The cold dissolution is put in the vessel V on top of the cylinder J, by closing cock 4, opening cock 13, and pouring the finings through a funnel into it, and directly afterward cock 13 is closed.

The solution of tannin is made by dissolving perfectly odorless and white tannin in cold water, heating the solution till it boils, cooling, and then filling it in the same manner into the vessel V and cylinder J.

For every twenty-two imperial gallons of beer it requires ten grams of gelatine mixed with one pint of beer, and 13.4 grams of tannin mixed with half a pint of beer.

As soon as the impregnation-vessel J is filled, the glue dissolution is put in the vessel V, and allowed to flow into the vessel J, and then the tannin solution added, when the beer is ready for impregnation.

The liquid having settled down again, the glue and tannin form an insoluble compound of large volume in the shape of a net, which sinks down and covers the most minute globules, forcing them to the bottom, and thus a perfectly brilliant beer is produced.

When the impregnating-vessel J has been emptied, the deposit of glue and tannin is removed by opening cock 6.

To produce stronger alcoholic beer, the respective quantity of alcohol, from one-half to one per cent., is added to the beer when still in the storage-cask, but the purest quality must be used.

During the heating the alcoholic flavor disappears entirely, assimilating with the flavor of the beer, and preserved beer has no taste which might indicate the alcohol.

The carbonic acid which is used must be perfectly pure, and is most advantageously manufactured of white limestone and hydrochloric acid in the vessel K, and freed from acid bubbles by washing in the vessel K'.

I do not claim heating and cooling malt liquors to prevent decomposition, broadly; but

What I claim is—

The herein-described process of treating beer with a solution of gelatine and tannin, prepared as described, substantially in the manner and for the purpose set forth.

DR. JOSEF BERSCH.

Witnesses:
EUGEN MARX,
CONSTANTIN MANDROVIC.